United States Patent
Joshi et al.

(10) Patent No.: US 12,487,474 B2
(45) Date of Patent: *Dec. 2, 2025

(54) DYNAMIC ADJUSTMENT OF PRISM FOR HEAD MOUNTED DISPLAY USING PHOTOCHROMATIC MATERIAL

(71) Applicant: Toyota Motor Engineering & Manufacturing North America, Inc, Plano, TX (US)

(72) Inventors: Shailesh N Joshi, Ann Arbor, MI (US); Ercan M Dede, Ann Arbor, MI (US)

(73) Assignee: TOYOTA MOTOR ENGINEERING & MANUFACTURING NORTH INC, Plano, TX (US)

( * ) Notice: Subject to any disclaimer, the term of this patent is extended or adjusted under 35 U.S.C. 154(b) by 794 days.

This patent is subject to a terminal disclaimer.

(21) Appl. No.: 17/670,142

(22) Filed: Feb. 11, 2022

(65) Prior Publication Data

US 2023/0258962 A1    Aug. 17, 2023

(51) Int. Cl.
*G02C 7/10* (2006.01)
*G02B 1/111* (2015.01)
*G02B 27/01* (2006.01)

(52) U.S. Cl.
CPC .............. *G02C 7/102* (2013.01); *G02B 1/111* (2013.01); *G02B 27/0172* (2013.01); *G02B 2027/014* (2013.01); *G02B 2027/0178* (2013.01)

(58) Field of Classification Search
CPC ...... G02C 7/102; G02B 1/111; G02B 27/017; G02B 27/0172; G02B 27/0176;
(Continued)

(56) References Cited

U.S. PATENT DOCUMENTS 5,989,462 A     11/1999  Buazza et al.
10,323,989 B2 *  6/2019  Ribi ................. B65D 1/36
(Continued)

FOREIGN PATENT DOCUMENTS

CN    110062070 A  *  7/2019  .......... H04M 1/0264
CN    117957479 A  *  4/2024  .......... G02B 27/0093

OTHER PUBLICATIONS

Andrew Lynch et al., Beam Manipulation: Prisms vs. Mirrors, Photonik International 45-47 (2009). (Year: 2009).*

(Continued)

*Primary Examiner* — Thomas K Pham
(74) *Attorney, Agent, or Firm* — Jordan IP Law, LLC (57) ABSTRACT

A head mounted display apparatus includes a display unit having an optical member, one or more elastically deformable position adjustment members operable to flexibly mount the optical member, and one or more light sources. The optical member has a reflective surface to direct rendered visual content towards an eye of a user. The elastically deformable position adjustment member(s) are moveable between a contracted state and an expanded state to adjust a spatial orientation of the optical member in a manner that adjusts a spatial orientation of the rendered visual content relative to the eye of the user. The elastically deformable position adjustment member(s) has one or more photochromatic regions that are moveable in response to exposure to ultraviolet (UV) light emitted by the light sources.

20 Claims, 9 Drawing Sheets (58) Field of Classification Search
CPC ...... G02B 2027/014; G02B 2027/0178; G02B 2027/0187; G02B 26/08; G02B 26/0825; F21S 41/25; F21S 41/29; F21S 41/635; B60Q 1/06; B60Q 2300/12; B60Q 2300/30; B60Q 2300/112

See application file for complete search history.

(56) References Cited

U.S. PATENT DOCUMENTS

| | | | | |
|---|---|---|---|---|
| 10,518,696 | B2* | 12/2019 | Puente | B60Q 1/0683 |
| 10,656,707 | B1* | 5/2020 | Sharma | G06F 3/013 |
| 11,137,610 | B1* | 10/2021 | Kessler | G02B 27/0176 |
| 11,213,661 | B2* | 1/2022 | Spindler | A61B 17/12136 |
| 11,603,975 | B1* | 3/2023 | Joshi | B60Q 1/06 |
| 11,703,685 | B1* | 7/2023 | Joshi | G02B 26/10 |
| | | | | 345/7 |
| 2008/0239452 | A1 | 10/2008 | Xu et al. | |
| 2010/0012028 | A1 | 1/2010 | Jinbo et al. | |
| 2010/0053121 | A1* | 3/2010 | Sprague | G02B 27/0172 |
| | | | | 345/204 |
| 2015/0276987 | A1 | 10/2015 | Mckenzie et al. | |
| 2015/0286073 | A1 | 10/2015 | Blum | |
| 2017/0050555 | A1 | 2/2017 | Chen | |
| 2017/0261768 | A1 | 9/2017 | Ambler et al. | |
| 2018/0267302 | A1* | 9/2018 | Border | G02B 26/0833 |
| 2018/0282147 | A1* | 10/2018 | Shinkawa | G02B 26/10 |
| 2018/0356652 | A1 | 12/2018 | Shibuya et al. | |
| 2019/0004325 | A1 | 1/2019 | Connor | |
| 2019/0124741 | A1 | 4/2019 | Dickie | |
| 2019/0278102 | A1* | 9/2019 | Suter | G02B 27/646 |
| 2020/0111258 | A1 | 4/2020 | Sears et al. | |
| 2020/0111259 | A1* | 4/2020 | Sears | G02B 27/0172 |
| 2021/0055693 | A1* | 2/2021 | Utsugi | H04N 9/3182 |
| 2023/0244075 | A1* | 8/2023 | Dede | G02B 26/0825 |
| | | | | 359/846 |

OTHER PUBLICATIONS

Jenean Carlton, Part 1: Understanding PRISM, 2012, pp. 1-13 [online], [retrieved Sep. 18, 2024], retrieved from the Internet <URL: https://eyecarebusiness.com/issues/2012/october/part-1-understanding-prism/>. (Year: 2012).*

Radiation: Ultraviolet (UV) Radiation, 2016, pp. 1-6 [online], [retrieved Sep. 17, 2024], retrieved from the Internet <URL: https://www.who.int/news-room/questions-and-answers/item/radiation-ultraviolet-(uv)>. (Year: 2016).*

Wayne Francis et al., Spiropyran Based Hydrogels Actuators—Walking in the Light, 250 Sensors and Actuators B 608-616 (2017). (Year: 2017).*

Lin Guan et al., Highly Transparent and Stretchable Hydrogels with Rapidly Responsive Photochromic Performance for UV-irradiated Optical Display Devices, 138 Reactive and Functional Polymers 88-95 (2019). (Year: 2019).*

Filip T. Szczypinski et al., Can We Predict Materials that can be Synthesised?, 12 Chemical Science 830-840 (2021). (Year: 2021).*

Jaber Keyvan Rad et al., Spiropyan-based advanced photoswitchable materials: a fascinating pathway to the Future Stimuli-responsive Devices, 51 Journal of Photochemistry & Photobiology, C: Photochemistry Reviews 100487-1 to 100487-65 (2022). (Year: 2022).*

Luuk Kortekaas et al., The Evolution of Spiropyran: Fundamentals and Progress of an Extraordinarily Versatile Photochrome, 48 Chemical Society Review 3406-3424 (2019). (Year: 2019).*

Amos Meeks et al., Spiropyran Photoisomerization Dynamics in Multiresponsive Hydrogels, 144 Journal of the American Chemical Society 219-227 (2021). (Year: 2021).*

Artur A. Khuzin et al., Synthesis, Photochromic and Luminescent Properties of Ammonium Salts of Spiropyrans, 27 Molecules 8492-1 to 8492-7 (2022). (Year: 2022).*

Ghilardi, Michele, Hugh Boys, Peter Török, James JC Busfield, and Federico Carpi. "Smart Lenses with electrically tuneable Astigmatism." Scientific reports 9, No. 1 (2019): 1-10.

Mishra, Kartikeya, Dirk Van den Ende, and Frieder Mugele. "Recent developments in optofluidic lens technology." Micromachines 7, No. 6 (2016): 102.

Li, Chuang, Aysenur Iscen, Liam C. Palmer, George C. Schatz, and Samuel I. Stupp. "Light-driven expansion of spiropyran hydrogels." Journal of the American Chemical Society 142, No. 18 (2020): 8447-8453.

* cited by examiner

DYNAMIC ADJUSTMENT OF PRISM FOR HEAD MOUNTED DISPLAY USING PHOTOCHROMATIC MATERIAL

TECHNICAL FIELD

One or more embodiments relate generally to a virtual and augmented reality-based head mounted display (HMD), a virtual and augmented reality-based HMD system, a computer implemented method of operating a virtual and augmented reality-based HMD, and a computer program product for operating a virtual and augmented reality-based HMD.

BACKGROUND

Display devices such as virtual and augmented reality-based HMDs, which generally include virtual reality (VR) eyewear and augmented reality (AR) eyewear, utilize a projector operable to project an image (e.g., a computer-generated image) to an optical member such as a prism that reflects the image to one or both eyes of the wearer. The prism can reflect the projection towards the eye(s) while allowing ambient light to pass therethrough. This creates an overlay of the projection onto the field of vision of the wearer.

The prism, however, is generally fixed in place, thereby preventing any adjustment of the information within the field of vision of the wearer. This may be problematic in situations where the information blocks or otherwise obscures the wearer's field of view.

BRIEF SUMMARY

One or more embodiments relate to a virtual and augmented reality-based HMD, a virtual and augmented reality-based HMD system, a computer implemented method of operating a virtual and augmented reality-based HMD, and a computer program product for operating a virtual and augmented reality-based HMD that are operable to enhance the operation of the HMD.

In accordance with one or more embodiments, the HDM utilizes flexible material that has spiropyran embedded within to adjust the reflection of a prism utilized in augmented reality glasses.

In accordance with one or more embodiments, the HDM includes an elastically deformable material having photochromatic properties that is dynamically moveable in response to one or more inputs signals or commands. Orientation of the prism is selectively adjustable to thereby facilitate orientation of the image reflected the prism in a plurality of directions. In this way, the rendered visual content is reoriented in a different location of the field-of-view (FOV) of the user/wearer. The elastically deformable material comprises an organic material such as, for example, spiropyran, that is embedded into a substrate material. The spiropyran will expand and contract in response to exposure to ultraviolet light.

In accordance with one or more embodiments, an example HMD apparatus comprises one or more of the following: a display unit that includes an optical member having a reflective surface to direct rendered visual content towards an eye of a user, and one or more elastically deformable position adjustment members operable to flexibly mount the optical member and adjust a spatial orientation of the optical member and thereby adjust a spatial orientation of the rendered visual content relative to the eye of the user, the one or more elastically deformable position adjustment members having one or more photochromatic regions that are moveable in response to exposure to ultraviolet (UV) light; and one or more light sources operable to selectively emit illuminating UV light in a direction that contacts the one or more photochromatic regions to thereby selectively adjust the spatial orientation of the optical member.

In accordance with the example HMD apparatus, the display unit further includes a projector member operable to project the rendered visual content.

In accordance with the example HMD apparatus, the one or more elastically deformable position adjustment members comprises a polymer substrate.

In accordance with the example HMD apparatus, the one or more photochromatic regions are composed of a photochromatic material that is embedded into the polymer substrate.

In accordance with the example HMD apparatus, the photochromatic material comprises an organic photochromatic material.

In accordance with the example HMD apparatus, the organic photochromatic material comprises spiropyran.

In accordance with the example HMD apparatus, the one or more light sources comprise LED light sources.

In accordance with the example HMD apparatus, the one or more elastically deformable position adjustment members are interconnected to each other on a surface of the optical member.

In accordance with one or more embodiments, an HMD system comprises one or more of the following: a head mounted display apparatus that includes a display unit having an optical member with a reflective surface to direct rendered visual content towards an eye of a user, one or more elastically deformable position adjustment members operable to flexibly mount the optical member and adjust a spatial orientation of the optical member, the one or more elastically deformable position adjustment members having one or more photochromatic regions that are moveable in response to exposure to ultraviolet (UV) light, and one or more light sources operable to selectively emit illuminating UV light in a direction that contacts the one or more photochromatic regions to thereby selectively adjust the spatial orientation of the optical member; and a control module, operatively coupled to the one or more light sources, the control module including one or more processors and a non-transitory memory operatively coupled to the one or more processors comprising a set of instructions executable by the one or more processors to cause the one or more processors to: dynamically adjust, in response to one or more of sensor data analysis and wireless communication network data, a spatial orientation of the rendered visual content relative to the eye of the user by causing movement of the optical member through a selective actuation of the one or more light sources.

In accordance with the example HMD system, the display unit further includes a projector member operable to project the rendered visual content.

In accordance with the example HMD system, the one or more elastically deformable position adjustment members comprises a polymer substrate.

In accordance with the example HMD system, the one or more photochromatic regions are composed of a photochromatic material that is embedded into the polymer substrate.

In accordance with the example HMD system, the photochromatic material comprises an organic photochromatic material.

In accordance with the example HMD system, the organic photochromatic material comprises spiropyran.

In accordance with the example HMD system, the one or more light sources comprise LED light sources.

In accordance with the example HMD system, the set of instructions cause the one or more processors to dynamically change the direction of light reflected by the optical member by selectively adjusting an intensity of the UV light emitted by the one or more light sources.

In accordance with one or more embodiments, an example computer-implemented method of operating an HMD apparatus comprises one or more of the following: dynamically adjusting, in response to one or more of sensor data analysis and wireless communication network data, a spatial orientation of rendered visual content relative to an eye of a user of the head mounted display system by causing movement of an optical member of the head mounted display system through a selective actuation of one or more light sources to selectively emit illuminating UV light in a direction that contacts one or more photochromatic regions of one or more elastically deformable position adjustment members that are moveable in response to exposure to the illuminating UV light, wherein the one or more elastically deformable position adjustment members are operable to flexibly mount the optical member.

In accordance with the example computer-implemented method, the sensor data relates to one or more of a 3D virtual reality environment and an augmented reality environment of the user.

In accordance with the example computer-implemented method, dynamically adjusting the spatial orientation of the rendered visual content comprises selectively adjusting an intensity of the UV light emitted by the one or more light sources.

In accordance with the example computer-implemented method, dynamically adjusting the spatial orientation of the rendered visual content comprises selectively adjusting a spatial orientation of the one or more light sources relative to the one or more elastically deformable position adjustment members.

In accordance with the example computer-implemented method, dynamically adjusting the spatial orientation of the rendered visual content comprises selectively adjusting a direction of UV light emitted by the one or more light sources.

In accordance with the example computer-implemented method, dynamically adjusting the spatial orientation of the rendered visual content comprises selectively adjusting a spatial orientation of the optical member.

In accordance with one or more embodiments, an example computer program product for operating an HMD apparatus, the computer program product including at least one computer readable medium, comprising a set of instructions, which when executed by one or more processors, cause the one or more processors to: dynamically adjust, in response to one or more of sensor data analysis and wireless communication network data, a spatial orientation of rendered visual content relative to an eye of a user of the HMD apparatus by causing movement of an optical member of the head mounted display system through a selective actuation of one or more light sources to selectively emit illuminating UV light in a direction that contacts one or more photochromatic regions of one or more elastically deformable position adjustment members that are moveable in response to exposure to the illuminating UV light, wherein the one or more elastically deformable position adjustment members are operable to flexibly mount the optical member.

In accordance with the example computer program product, the sensor data relates to one or more of a 3D virtual reality environment and an augmented reality environment of the user.

In accordance with the example computer program product, dynamically adjusting the spatial orientation of the rendered visual content comprises selectively adjusting an intensity of the UV light emitted by the one or more light sources.

In accordance with the example computer program product, dynamically adjusting the spatial orientation of the rendered visual content comprises selectively adjusting a spatial orientation of the one or more light sources relative to the one or more elastically deformable position adjustment members.

In accordance with the example computer program product, dynamically adjusting the spatial orientation of the rendered visual content comprises dynamically adjusting a direction of UV light emitted by the one or more light sources.

In accordance with the example computer program product, dynamically adjusting the spatial orientation of the rendered visual content comprises dynamically adjusting a spatial orientation of the optical member.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
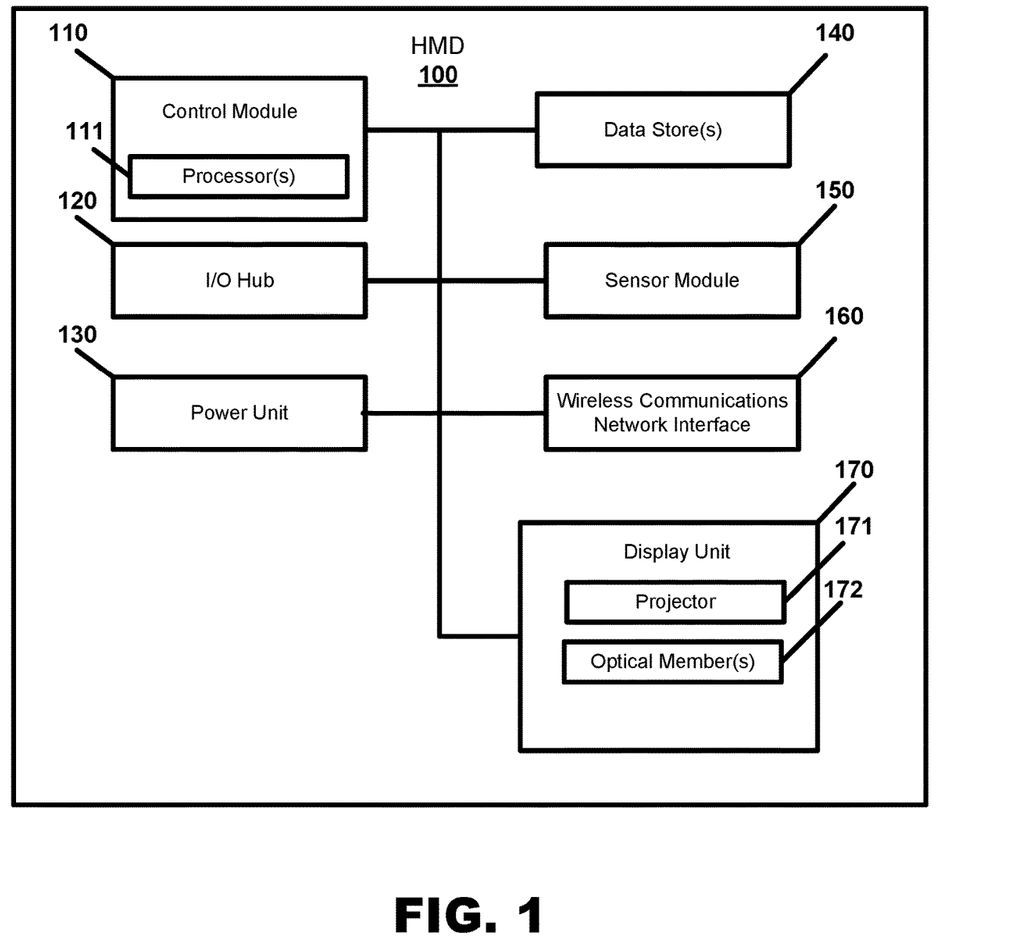
FIG. 1 illustrates a block diagram of an example HMD system, in accordance with one or more embodiments set forth, shown, and described herein.

Turning to the figures, in which FIG. 1 illustrates an example HMD system 100, in accordance with one or more embodiments. In accordance with one or more embodiments, the "HMD" may comprise any form of wearable display to be worn by a wearer or user.

Figure 2:
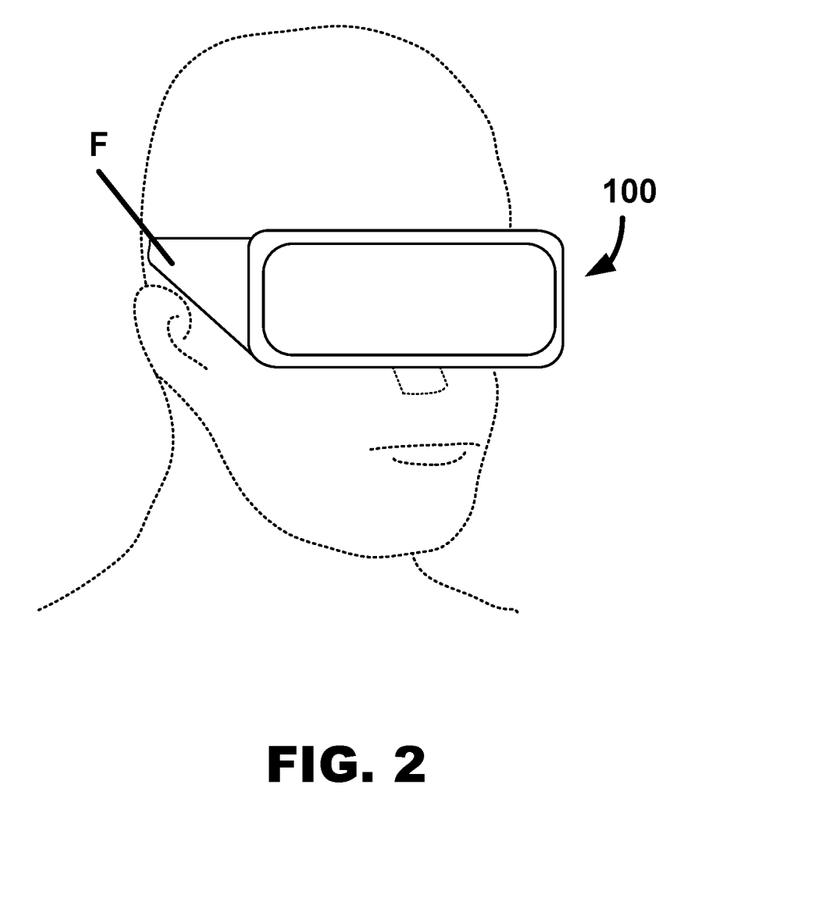
FIG. 2 illustrates an example HMD system worn by a user, in accordance with one or more embodiments set forth, shown, and described herein.

As illustrated in FIG. 2, in accordance with one or more embodiments, the HMD system 100 is operable to be worn by a user/wearer while experiencing an immersive environment such as, for example, a virtual reality (VR) environment, an augmented reality (AR) environment, a multi-player three-dimensional (3D) gaming environment, etc. Although the illustrated embodiment illustrates a monocular HMD, embodiments are not limited thereto. This disclosure contemplates the HMD system 100 comprising any suitable form that falls within the spirit and scope of the principles of this disclosure, such as, for example, a binocular HMD.

In accordance with one or more embodiments, the HMD system 100 may have application in a variety of environments, including, but not limited to, gaming, commercial, military, medical, etc. Embodiments, however, are not limited thereto, and thus, this disclosure contemplates the HMD system 100 having any suitable application that falls within the spirit and scope of the principles of this disclosure.

In accordance with one or more embodiments, the HMD system 100 may comprise one or more operational elements. Some of the possible operational elements of the HMD system 100 are illustrated in FIG. 1 and will now be described. It will be understood that it is not necessary for the HMD system 100 to have all the elements illustrated in FIG. 1 and/or described herein. The HMD system 100 may have any combination of the various elements illustrated in FIG. 1. Moreover, the HMD system 100 may have additional elements to those illustrated in FIG. 1.

In accordance with one or more embodiments, the HMD system 100 may not include one or more of the elements shown in FIG. 1. Moreover, while the various operational elements are illustrated as being located within the HMD system 100, embodiments are not limited thereto, and thus, one or more of the operational elements may be located external to the HMD system 100, and even physically separated by large spatial distances.

In accordance with one or more embodiments, the HMD system 100 comprises a control module 110 comprising one or more processors 111. As set forth, described, and/or illustrated herein, "processor" means any component or group of components that are operable to execute any of the processes described herein or any form of instructions to carry out such processes or cause such processes to be performed. The one or more processors may be implemented with one or more general-purpose and/or one or more special-purpose processors 111. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) operable to carry out instructions contained in program code. In embodiments in which there is a plurality of processors 111, such processors 111 may work independently from each other, or one or more processors 111 may work in combination with each other.

In accordance with one or more embodiments, the HMD system 100 may comprise an I/O hub 120 operatively connected to other systems of the HMD system 100. The I/O hub 120 may comprise an input interface, an output interface, and a network controller to facilitate communications between the HMD system 100 and other HMD systems worn by other users. The input interface and the output interface may be integrated as a single, unitary interface, or alternatively, be separate as independent interfaces that are operatively connected.

The input interface is defined herein as any apparatus, device, component, system, element, or arrangement or groups thereof that enable information/data to be entered in a machine. The input interface may receive an input from a user/wearer of the HMD system 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touchpad, touchscreen, multi-touch screen, button, joystick, mouse, trackball, microphone and/or combinations thereof.

The output interface is defined herein as any apparatus, device, component, system, element or arrangement or groups thereof that enable information/data to be presented to a user/wearer of the HMD system 100. The output interface may be operable to present information/data to the user, wearer, and/or remote operator. The output interface may comprise one or more of a visual display or an audio display such as a microphone, earphone, and/or speaker. One or more components of the HMD system 100 may serve as both a component of the input interface and a component of the output interface.

In accordance with one or more embodiments, the HMD system 100 may comprise a power unit 130 (e.g., battery power, solar power, electric power, adapter) operable as a power source to provide power to the HMD system 100.

In accordance with one or more embodiments, the HMD system 100 may comprise one or more data stores 140 for storing one or more types of data. Such data may include, but is not limited to, traffic history on the roadway, accident history on the roadway, weather history, traffic laws/guidelines based on a geographic location of the HMD system 100, etc. The HMD system 100 may include interfaces that enable one or more components and/or subsystems thereof to manage, retrieve, modify, add, or delete, the data stored in the one or more data stores 140. The one or more data stores 140 may comprise volatile and/or non-volatile memory. Examples of suitable one or more data stores 140 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 140 may be a component of the control module 110, or alternatively, may be operatively connected to the control module 110 for use thereby. As set forth, described, and/or illustrated herein, "operatively connected" may include direct or indirect connections, including connections without direct physical contact.

In accordance with one or more embodiments, the HMD system 100 may comprise a sensor module 150 operable, at least during operation of the HMD system 100, to dynamically detect, determine, capture, assess, monitor, measure, quantify, and/or sense information about the HMD system 100 and/or the user/wearer, and/or an environment external to the HMD system 100. As set forth, described, and/or illustrated herein, "sensor" means any apparatus, device, component and/or system that can perform one or more of detecting, determining, assessing, monitoring, measuring, quantifying, and sensing something. The one or more sensors of the sensor module 150 may be operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor module 150 may comprise for example, one or more sensors including, but not limited to a pressure sensor to detect when the user/wearer engages by direct or indirect contact a touchscreen or touchpad of the HMD system 100 or a computing device in operable communication with the HMD system 100. The sensor module 150 may also comprise a motion detecting sensor to detect one or more physical gestures or movements by the user/wearer. The sensor module 150 may also comprise an accelerometer, a gyroscope, etc. to detect an external environment of the HMD system 100.

The sensor module 150 and/or the one or more sensors thereof may be operatively connected to the control module 110, the one or more data stores 140, and/or other subsystems, elements, components, modules of the HMD system 100. The sensor module 150 and/or any of the one or more sensors set forth, illustrated, and described herein may be provided or otherwise positioned in any suitable location with respect to the HMD system 100. For example, one or more of the sensors may be located internally within the HMD system 100, one or more of the sensors may be located on the exterior of the HMD system 100, one or more of the sensors may be located to be exposed to the exterior of the HMD system 100, and/or one or more of the sensors may be located within a subsystem or component of the HMD system 100. The one or more sensors may be provided or otherwise positioned in any suitable manner that permits practice of the one or more embodiments.

In accordance with one or more embodiments, the one or more sensors of the sensor module 150 may work independently from each other, or alternatively, may work in combination with each other. The one or more sensors of the sensor module 150 may be used in any combination, and may be used redundantly to validate and improve the accuracy of the detection.

During operation of the HMD system 100, the processor (s) of the control module 110 may be operable to selectively activate one or more of the sensors of the sensor module 150.

In accordance with one or more embodiments, the HMD system 100 may comprise a wireless communications network interface 160 that includes functionality for wireless communication, such as BLUETOOTH® communication, near-field communication (NFC), or infrared (IR) communication or communication with wireless local area networks (WLANs) or cellular-telephone network. For example, the one or more processors 111 of the control module 110 may, via the wireless communications network interface 160, facilitate wireless communication with one or more HMDs and/or mobile computing devices having wireless functionality. In this way, the user/wearer of the HMD system 100 may send one or more wireless input command signals to dynamically adjust the position or orientation of the projection of rendered visual content (e.g., images and/or video). The rendered visual content may comprise, for example, a rendered 3D VR environment. The rendered visual content may comprise, for example, a 3D augmented reality (AR) environment.

In such an example, the mobile computing device may be operable to execute software applications (e.g., games) that provide rendered visual content to be viewed by the user/wearer of the HMD system 100.

Figure 3:
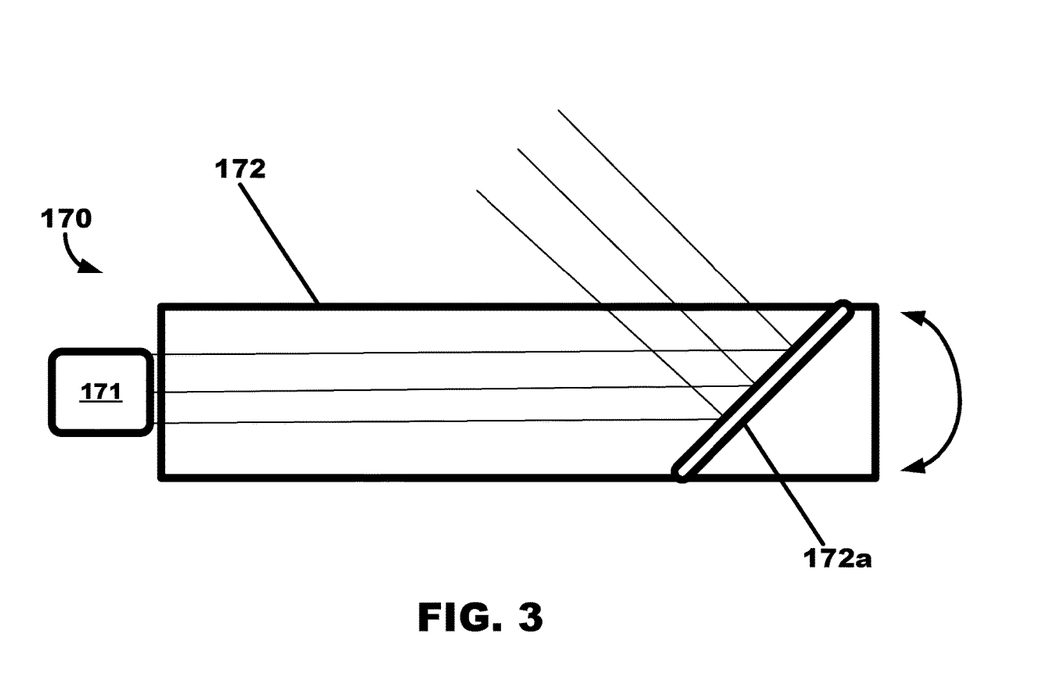
FIG. 3 illustrates an example projector and optical member of a display unit of the example HMD system of FIG. 2.

In accordance with one or more embodiments, as illustrated in FIG. 3, the HMD system 100 may comprise a display unit 170 operable to display rendered visual content to be viewed by the user/wearer. The display unit 170 includes but is not limited to, a projector member 171 operable to project the rendered visual content, and one or more optical members 172 (e.g., prism(s)) flexibly mounted on a frame F to direct the rendered visual content towards one eye (monoscopic) or both eyes (stereoscopic) of the user/wearer. The one or more optical members 172 may comprise a prism having a reflective surface 172*a* operable to reflect the rendered visual content towards one eye or both eyes of the user/wearer.

As illustrated in FIGS. 5A through 5D, an example HMD apparatus 500 is provided in accordance with one or more embodiments. The HMD apparatus 500 comprises a projector member 571 operable to project rendered visual content, and an optical member 570 (e.g., a prism) operable to direct or otherwise reflect the rendered visual content towards an eye (or both eyes) of a user/wearer. The optical member 570 is flexibly mounted to a housing or frame F of the HMD apparatus 500 via one or more elastically deformable position adjustment members, namely, a first elastically deformable position adjustment member 521, a second elastically deformable position adjustment member 522, a third elastically deformable position adjustment member 523, and a fourth elastically deformable position adjustment member 524. In the illustrated example embodiment, the one or more elastically deformable position adjustment members 521, 522, 523, and 524 are positioned on a peripheral surface of the optical member 570.

Although the illustrated example embodiment shows four elastically deformable position adjustment members 521, 522, 523, and 524, embodiments are not limited thereto. This disclosure contemplates the overall number of elastically deformable position adjustment members may include more or less elastically deformable position adjustment members with respective light sources within the spirit and scope of the principles of this disclosure. For example, the optical member 570 can, based on the overall number of elastically deformable position adjustment members, have different degrees of freedom.

Alternatively or additionally, the one or more elastically deformable position adjustment members 521, 522, 523, and 524 may be interconnected to each other via one or more links 525 to form a unitary elastically deformable position adjustment apparatus. Alternatively or additionally, the elastically deformable position adjustment members 521, 522, 523, and 524 may be interconnected to each other via direct contact at respective contact interfaces to form a unitary elastically deformable position adjustment apparatus. Although the illustrated example embodiment shows the elastically deformable position adjustment members 521, 522, 523, and 524 have a substantially circular geometric shape/cross-section, embodiments are not limited thereto. This disclosure contemplates the elastically deformable position adjustment members having any geometric shape/cross-section that falls within the spirit and scope of the principles of this disclosure, including, but not limited to, a substantially rectangular geometric shape/cross-section, a substantially triangular geometric shape/cross-section, a substantially square geometric shape/cross-section, a substantially polygonal geometric shape/cross-section, etc.

In accordance with one or more embodiments, the first elastically deformable position adjustment member 521, the second elastically deformable position adjustment member 522, the third elastically deformable position adjustment member 523, and the fourth elastically deformable position adjustment member 524 are operable to adjust a mounting orientation of the optical member 570. The first elastically deformable position adjustment member 521, the second elastically deformable position adjustment member 522, the third elastically deformable position adjustment member 523, and the fourth elastically deformable position adjustment member 524 may be arranged so as to be mounted or otherwise attached (directly or indirectly) at an attachment interface between the housing or frame F and the optical member 570.

In accordance with one or more embodiments, the first elastically deformable position adjustment member 521, the second elastically deformable position adjustment member 522, the third elastically deformable position adjustment member 523, and the fourth elastically deformable position adjustment member 524 are composed of an elastically deformable base or substrate material, such as, for example, a polymer. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the elastically deformable position adjustment members 521, 522, 523, and 524 being composed of any suitable material that falls within the spirit and scope of the principles of this disclosure. Alternatively or additionally, the elastically deformable material may comprise a shape memory material.

Figure 6:
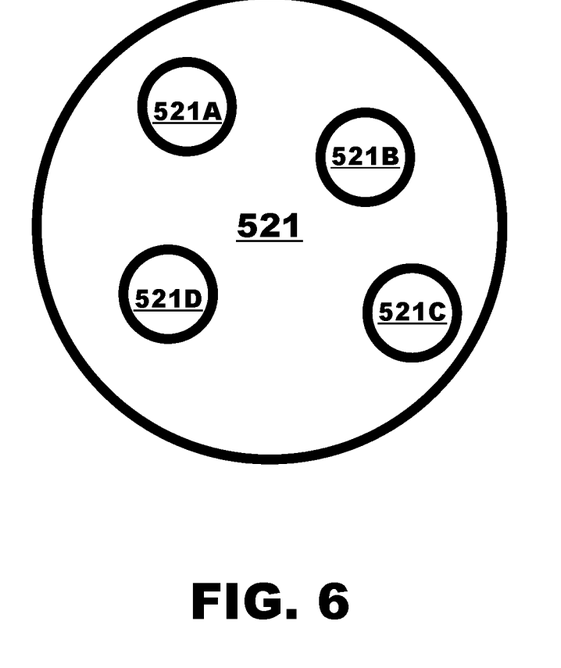
FIG. 6 illustrates example photochromatic regions of an elastically deformable position adjustment member, in accordance with one or more embodiments set forth, shown, and described herein.

As illustrated in FIG. 6, the elastically deformable base material may include one or more photochromatic regions. For example, in the illustrated embodiment, first elastically deformable position adjustment member 521, includes photochromatic regions 521A, 521B, 521C, and 521D that are moveable from a contracted state to an expanded state in response to exposure to ultraviolet (UV) light. The one or more photochromatic regions 521A, 521B, 521C, and 521D may be integrated or otherwise embedded into the elastically deformable base material of one or more of the elastically deformable position adjustment members 521, 522, 523, and 524. The one or more photochromatic regions 521A, 521B, 521C, and 521D may be integrated or otherwise embedded so as to be partially or fully exposed from the surface of one or more of the elastically deformable position adjustment members 521, 522, 523, and 524. The one or more photochromatic regions 521A, 521B, 521C, and 521D are composed of an organic photochromatic material, such as, for example, spiropyran. Embodiments, however, are not limited thereto, and thus, this disclosure contemplates the photochromatic regions 521A, 521B, 521C, and 521D being composed of any suitable photochromatic material or composite materials that falls within the spirit and scope of the principles of this disclosure. For example, during production of the elastically deformable position adjustment members 521, 522, 523, and 524, the photochromatic material may be mixed into the elastically deformable base material.

Figure 5A:
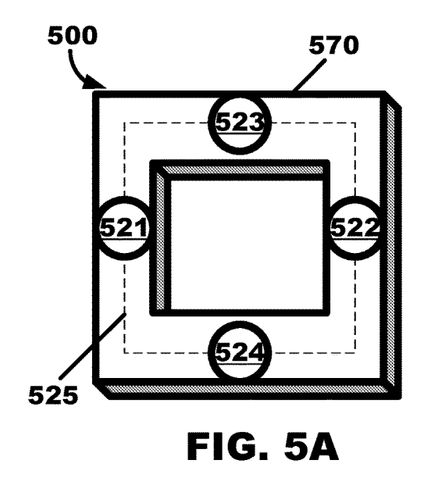
FIGS. 5A through 5D illustrate an example display unit of an example HMD system having elastically deformable position adjustment members in a contracted state (FIG. 5B) and one of the elastically deformable position adjustment members in an expanded state (FIG. 5C), in accordance with one or more embodiments set forth, shown, and described herein.
Figure 5B:
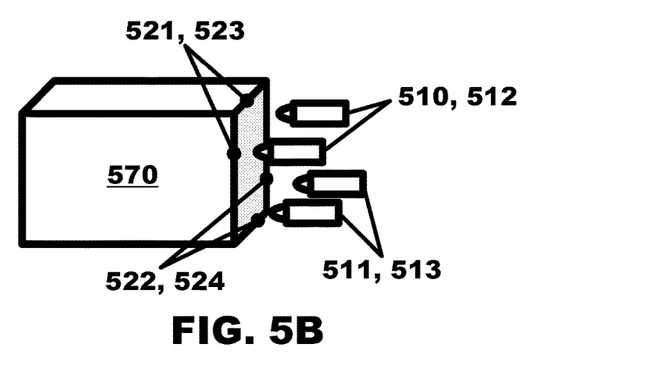
Figure 5C:
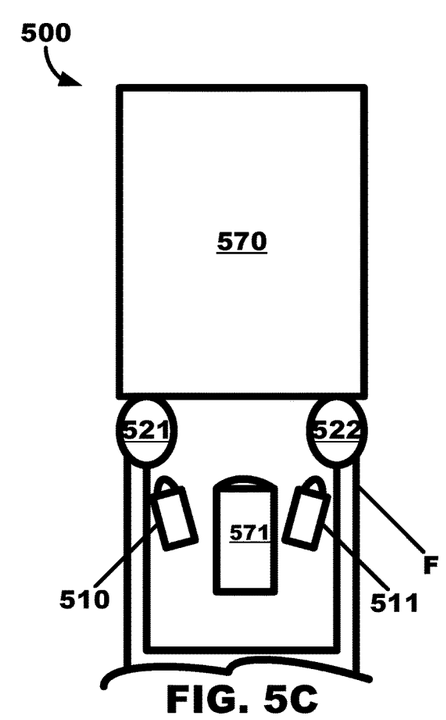

As illustrated in FIG. 5B, the HMD apparatus 500 further comprises one or more light sources positioned in/on the frame F adjacent to a corresponding elastically deformable position adjustment member. In the illustrated example embodiment, the one or more light sources include a first light source 510 (corresponding to the first elastically deformable position adjustment member 521), a second light source 511 (corresponding to the second elastically deformable position adjustment member 522), a third light source 512 (corresponding to the third elastically deformable position adjustment member 523), and a fourth light source 513 (corresponding to the fourth elastically deformable position adjustment member 524).

When all light sources 510, 511, 512, and 513 are in a deactivated operating state, the optical member 570 remains in an initial orientation. The light sources 510, 511, 512, and 513, however, may be selectively activated to reorient the optical member 570 from the initial orientation. In particular, the light sources 510, 511, 512, and 513 may be selectively activated to emit illuminating UV light in a direction that selectively contacts the one or more photochromatic regions of each corresponding one of the elastically deformable position adjustment members 521, 522, 523, and 524 in a manner that causes selective adjustment or reorientation in the mounting position (i.e., spatial orientation) of the optical member 570. This selective adjustment thereby causes a change of direction, orientation, or spatial location of the rendered visual content (image) projected by the projector 571 into the eye(s) of the user/wearer. This facilitates projection of the rendered visual content at a different position of the eye(s) of the user/wearer, effectively changing the position from the viewpoint of the user/wearer. Depending on the intensity and illumination of the UV light provided by the light sources 510, 511, 512, and 513, different degrees of freedom of movement can be accomplished.

In accordance with one or more embodiments, one or more baffles may be provided in order to isolate light from the light sources 510, 511, 512, and 513.

Figure 5D:
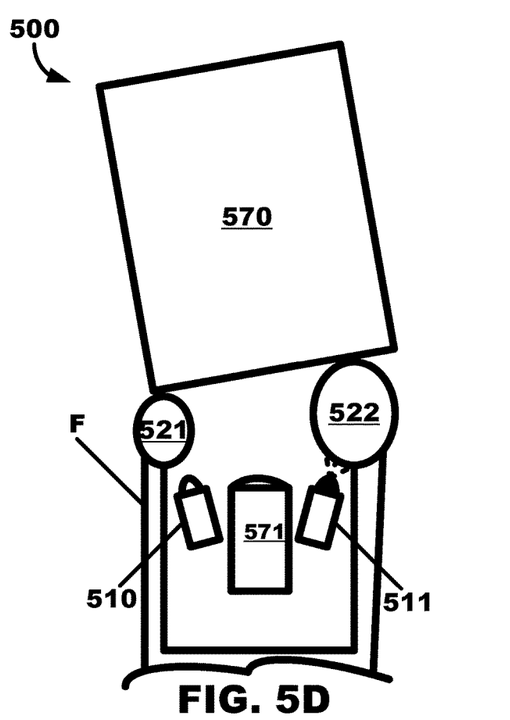

In the illustrated example embodiment of FIG. 5D, the second light source 511 is selectively activated to emit UV light, thereby causing expansion of the spiropyran material of the second elastically deformable position adjustment member 522. Because the remaining light sources, namely the first light source 510, the third light source 512, and the fourth light source 513 are not activated, the spiropyran material of the first elastically deformable position adjustment member 521, the third elastically deformable position adjustment member 523, and the fourth elastically deformable position adjustment member 524, respectively, is maintained in an unexpanded state. This causes the selective reorientation in the mounting position of the optical member 570, and thus, the reflective member 570a.

In accordance with one or more embodiments, the light sources 510, 511, 512, and 513 comprises LEDs. The light sources 510, 511, 512, and 513 are controlled by the control module 110 to selectively reorient the mounting position of the optical member 570, and thus, the reflective member 570a.

Alternatively or additionally, the control module 110 may be operable to control one or more of the respective orientations of the light sources 510, 511, 512, and 513 and the intensity of the UV light emitted by the light sources 510, 511, 512, and 513.

For example, the position of the light sources 510, 511, 512, and 513 may be selectively adjusted in order to emit UV light in a direction that contacts only certain photochromatic regions, but no other photochromatic regions. This adjustment may be necessary in order to direct the rendered visual content reflected by the optical member 520 in a specific direction.

In accordance with one or more embodiments, the control module 110 may include non-transitory memory operatively coupled to the one or more processors 111, comprising a set of instructions executable by the one or more processors 111 to cause the one or more processors 111 to dynamically conduct an analysis of sensor data transmitted by the sensor module 150. In response to the analysis of the sensor data, the control module 110 may then selectively adjust a spatial location of the rendered visual content reflected by the optical member 570 by adjusting the mounting orientation of the optical member 570 through a selective actuation of one or more of the light sources 510, 511, 512, and 513.

In accordance with one or more embodiments, the adjustment in the direction, orientation, or spatial location of the rendered visual content projected by the projector 571 may be in response to sensor data relating to user/wearer input command signals. For example, the HMD system 100 or a mobile computing device operatively connected to the HMD system 100 may include a touchscreen or touchpad to which a user/wearer may interact to supply one or more input command signals. The one or more processors 111 may cause selectively reorientation in the mounting position of the optical member 570 in response to receipt of sensor data related to a touch sensor or accelerometer operable to detect when the user/wearer physically touches or taps the housing or frame F of the HMD system 100. Upon detecting a touch or tap by the user/wearer, the one or more processors 111 may selectively actuate the one or more of the light sources 510, 511, 512, and 513 to thereby cause adjustment in the direction, orientation, or spatial location of the rendered visual content projected by the projector 571 in a manner that changes the viewpoint of the user/wearer.

Alternatively or additionally, the adjustment in the direction, orientation, or spatial location of the rendered visual content projected by the projector 571 may be in response to a wireless input command signal sent by a mobile computing device (e.g., through the user/wearer and/or a $3^{rd}$ party non-user/wearer). For example, the one or more processors 111 may cause selectively reorientation in the mounting position of the optical member 570 in response to the wireless input command signal via the wireless communications network interface 160.

In accordance with one or more embodiments, the adjustment of the mounting orientation of the optical member 570 corresponds to an amount or intensity of light emitted by the light sources 510, 511, 512, and 513. Accordingly, in response to the analysis of the sensor data or receipt of a wireless input command signal, the control module 110 may be operable to dynamically adjust the direction, orientation, or spatial location of the rendered visual content projected by the projector 571 by selectively adjusting an intensity of the UV light emitted by one or more of the light sources 510, 511, 512, and 513. The greater the intensity of the UV light may thus yield greater adjustments in the mounting orientation of the optical member 570.

Figure 4:
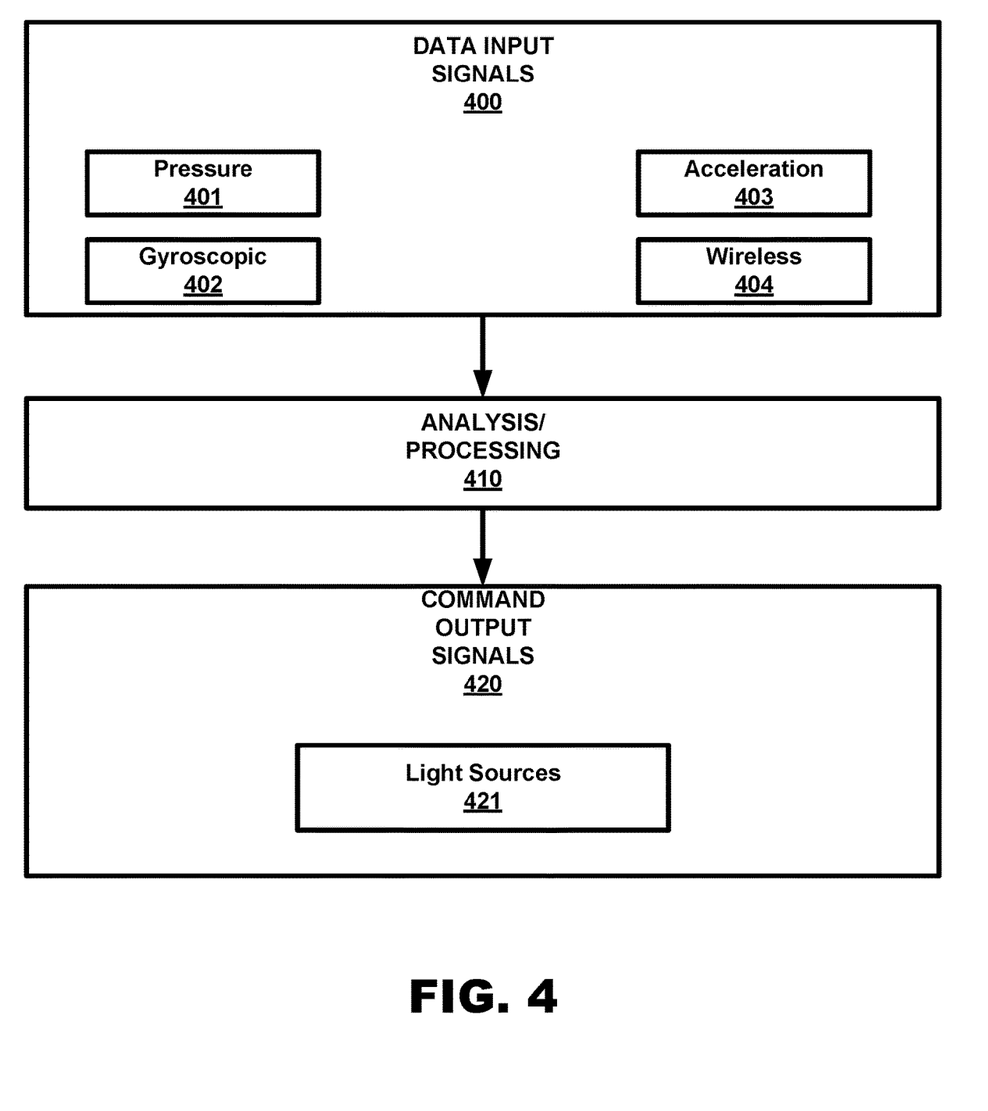
FIG. 4 illustrates a block diagram of control blocks for implementation in an example HMD system, in accordance with one or more embodiments set forth, shown, and described herein.

As illustrated in FIG. 4, in accordance with one or more embodiments, the control module 110 is operable to receive one or more data input signals 400, such as, for example, sensor data (pressure 401, gyroscopic 402, and acceleration 403) from the sensor module 150. The one or more processors 111 of the control module 110, in response to the sensor data, are then operable to dynamically conduct an analysis 410 of the sensor data. In response to the analysis 410 of the sensor data, the one or more processors 111 are to then send one or more command output signals 420 to one or more of the light sources 510, 511, 512, and 513 to cause the adjustment of the mounting orientation of the optical member 570, and thus, dynamic adjustment of the direction, orientation, or spatial location of the rendered visual content projected by the projector 571.

In accordance with one or more embodiments, the control module 110 is also operable to receive one or more data signals 404 via the wireless communications network interface 160. The wireless communications network interface 160 is configured to facilitate wireless communication between the HMD system 100 and one or more external computing devices. In one or more example embodiments, the control module 110 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments. The one or more processors 111 of the control module 110, in response to the wireless communications network data, are then operable to then send one or more command output signals 420 to one or more of the light sources 510, 511, 512, and 513 to cause the adjustment of the mounting orientation of the optical member 570, and thus, dynamic adjustment of the direction, orientation, or spatial location of the rendered visual content projected by the projector 571.

Illustrated examples shown in FIGS. 7 to 12 set forth computer-implemented methods 700, 800, 900, 1000, 1100, and 1200 of operating an HMD apparatus that comprises a display unit having an optical member with a reflective surface to direct rendered visual content towards an eye of a user, one or more elastically deformable position adjustment members operable to flexibly mount the optical member and adjust a spatial orientation of the optical member, the one or more elastically deformable position adjustment members having one or more photochromatic regions that are moveable in response to exposure to ultraviolet (UV) light, and one or more light sources operable to selectively emit illuminating UV light in a direction that contacts the one or more photochromatic regions to thereby selectively adjust the spatial orientation of the optical member.

The computer-implemented methods 700, 800, 900, 1000, 1100, and 1200 may be implemented, for example, in logic instructions (e.g., software), configurable logic, fixed-functionality hardware logic, etc., or any combination thereof. In accordance with one or more embodiments, execution of the computer-implemented methods 700, 800, 900, 1000, 1100, and 1200 may be performed by one or more of the control module 110 in a manner that facilitates reorienting the rendered visual content in a different location of the FOV of the user/wearer.

Figure 7:
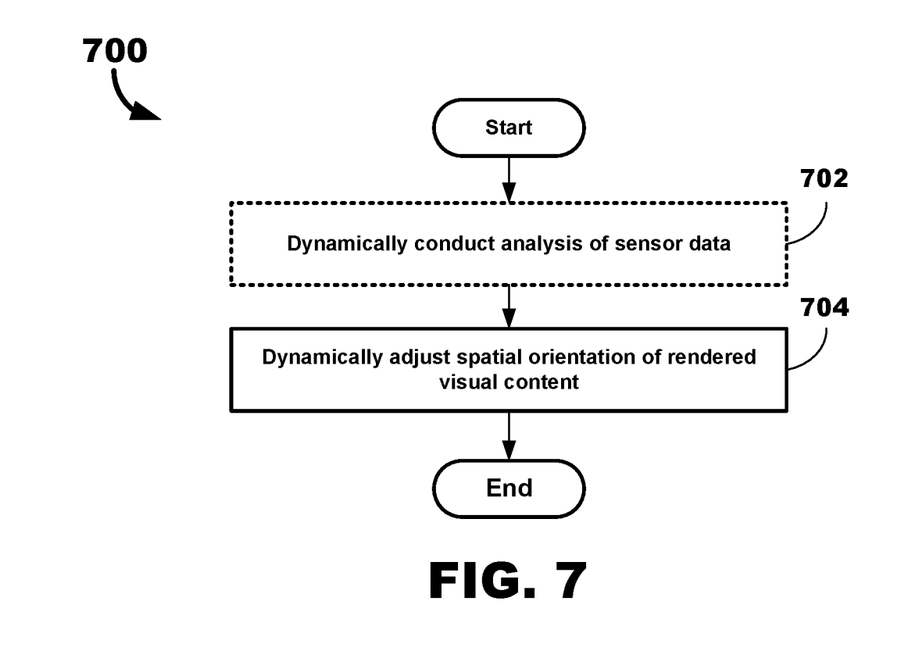
FIGS. 7 through 12 illustrate flowcharts of one or more example computer-implemented methods of operating an HMD apparatus, in accordance with one or more embodiments set forth, shown, and described herein.

In the computer-implemented method 700 illustrated in FIG. 7, process block 702 includes dynamically conducting an analysis of sensor data.

In accordance with the computer-implemented method 700, the sensor data relates to relates to a 3D virtual reality environment of a user. Alternatively or additionally, the sensor data relates to a 3D augmented reality environment of the user.

The computer-implemented method 700 may then proceed to illustrated process block 704, which includes dynamically adjusting, in response to one or more of sensor data analysis and wireless communication network data, a spatial orientation of rendered visual content relative to an eye of a user of the HMD apparatus.

In accordance with the computer-implemented method 700, such dynamic adjustment of the spatial orientation of rendered visual content comprises selectively actuating one or more light sources to selectively emit illuminating UV light in a direction that contacts one or more photochromatic regions of the elastically deformable position adjustment members.

The computer-implemented method 700 may terminate or end after execution of process block 704.

Figure 8:
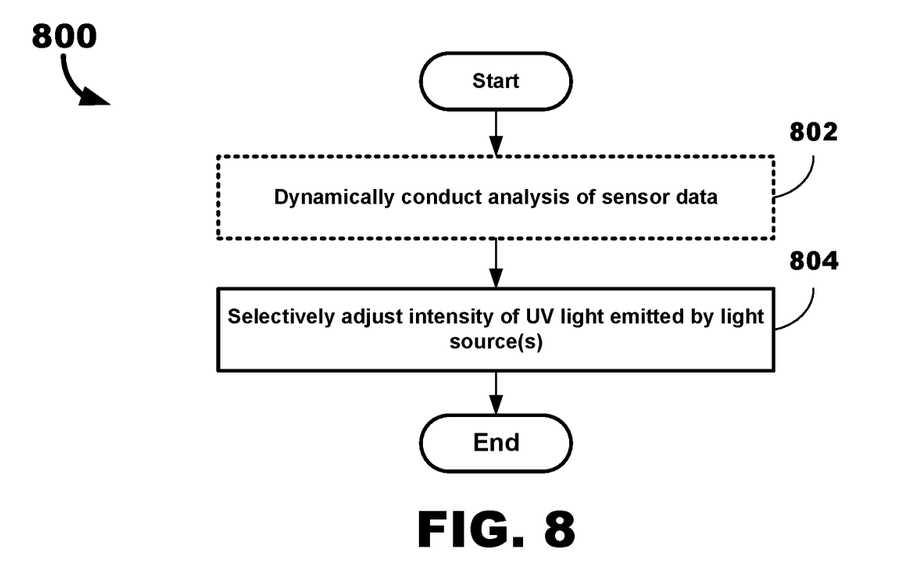

In the computer-implemented method 800 illustrated in FIG. 8, illustrated process block 802 includes dynamically conducting an analysis of sensor data.

In accordance with the computer-implemented method 800, the sensor data relates to relates to a 3D virtual reality environment of a user. Alternatively or additionally, the sensor data relates to a 3D augmented reality environment of the user.

The computer-implemented method 800 may then proceed to illustrated process block 804, which includes selectively adjusting an intensity of the UV light emitted by the one or more light sources which is to contact the one or more photochromatic regions of the elastically deformable position adjustment members.

The computer-implemented method 800 may terminate or end after execution of process block 804.

Figure 9:
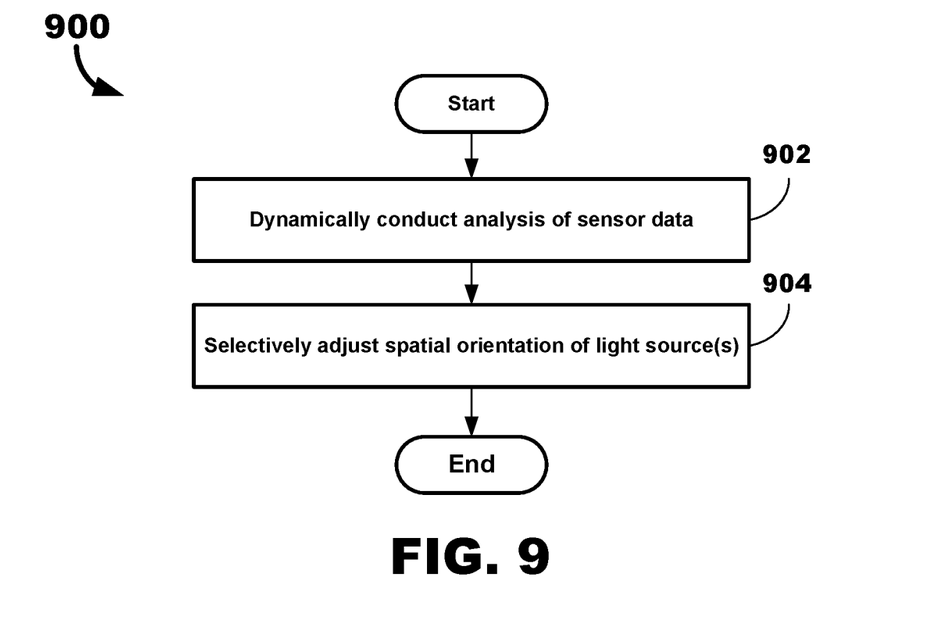

In the computer-implemented method 900 illustrated in FIG. 9, process block 902 includes dynamically conducting an analysis of sensor data.

In accordance with the computer-implemented method 900, the sensor data relates to relates to a 3D virtual reality environment of a user. Alternatively or additionally, the sensor data relates to a 3D augmented reality environment of the user.

The computer-implemented method 900 may then proceed to illustrated process block 904, which includes selectively adjusting a spatial orientation of the one or more light sources relative to the one or more elastically deformable position adjustment members in order to facilitate selective contact of UV light on the one or more photochromatic regions of the elastically deformable position adjustment members.

The method 900 may terminate or end after execution of process block 904.

Figure 10:
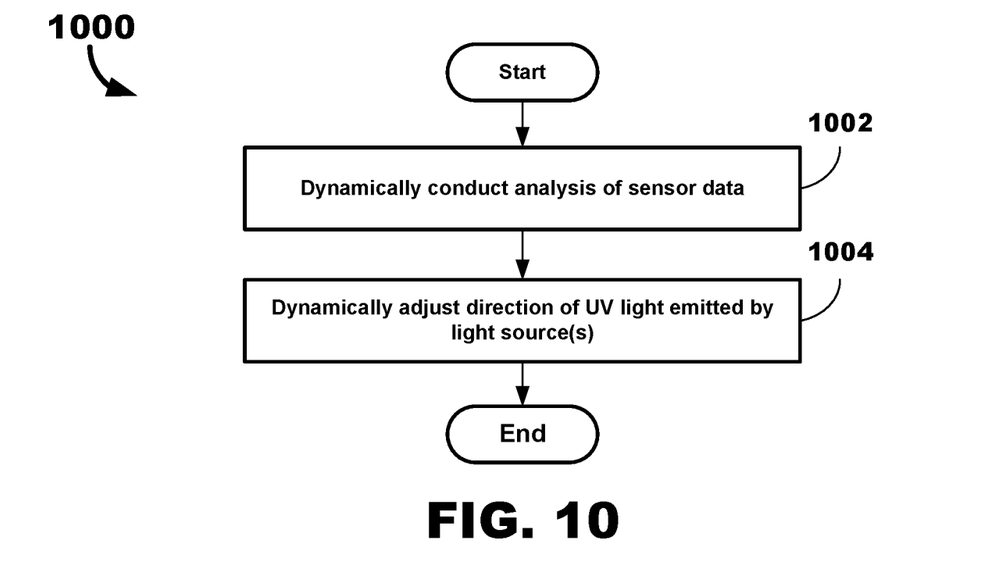

In the computer-implemented method 1000 illustrated in FIG. 10, illustrated process block 1002 includes dynamically conducting an analysis of the sensor data.

In accordance with the computer-implemented method 1000, the sensor data relates to relates to a 3D virtual reality environment of a user. Alternatively or additionally, the sensor data relates to a 3D augmented reality environment of the user.

The computer-implemented method 1000 may then proceed to illustrated process block 1004, which includes dynamically adjusting a direction of UV light emitted by the one or more light sources to adjust the spatial orientation of the rendered visual content relative to an eye of a user of the HMD apparatus.

The computer-implemented method 1000 may terminate or end after execution of process block 1004.

Figure 11:
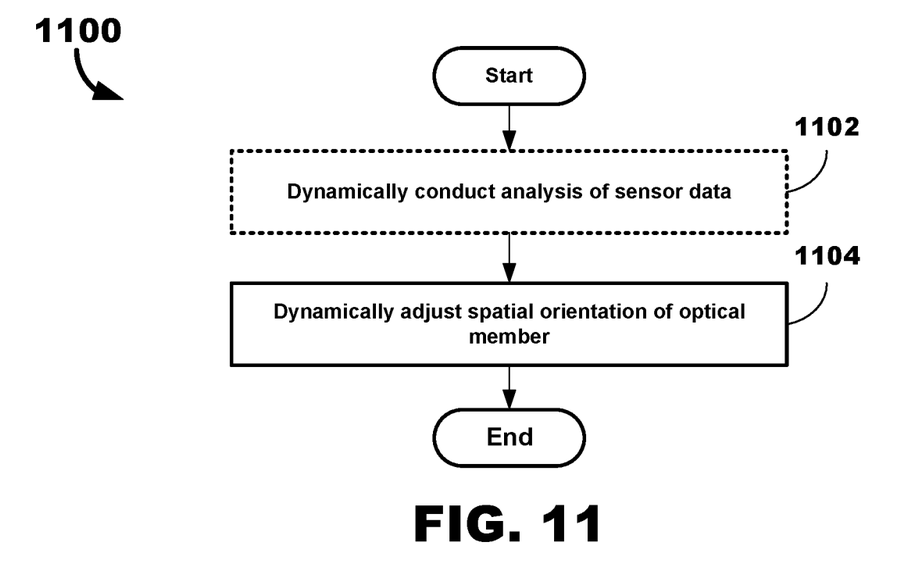

In the computer-implemented method 1100 illustrated in FIG. 11, illustrated process block 1102 includes dynamically conducting an analysis of the sensor data.

In accordance with the computer-implemented method 1100, the sensor data relates to relates to a 3D virtual reality environment of a user. Alternatively or additionally, the sensor data relates to a 3D augmented reality environment of the user.

The computer-implemented method 1100 may then proceed to illustrated process block 1104, which includes dynamically adjusting a spatial orientation of the optical member to adjust the spatial orientation of the rendered visual content relative to an eye of a user of the HMD apparatus.

The computer-implemented method 1100 may terminate or end after execution of process block 1104.

Figure 12:
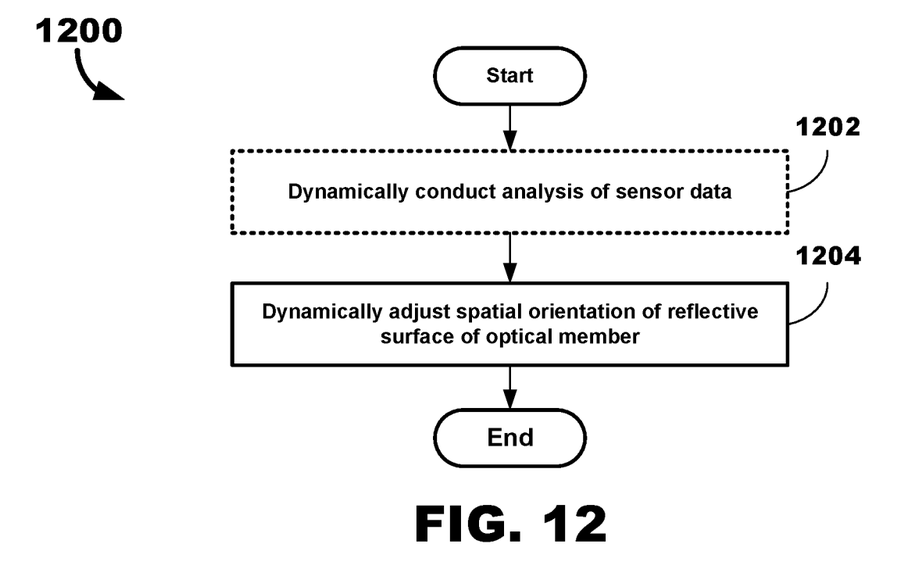

In the computer-implemented method 1200 illustrated in FIG. 12, illustrated process block 1202 includes dynamically conducting an analysis of the sensor data.

In accordance with the computer-implemented method 1200, the sensor data relates to relates to a 3D virtual reality environment of a user. Alternatively or additionally, the sensor data relates to a 3D augmented reality environment of the user.

The computer-implemented method 1200 may then proceed to illustrated process block 1204, which includes dynamically adjusting a spatial orientation of the reflective surface of the optical member to adjust the spatial orientation of the rendered visual content relative to an eye of a user of the HMD apparatus.

The computer-implemented method 1200 may terminate or end after execution of process block 1204.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A head mounted display apparatus, comprising:
a display unit that includes an optical member having a reflective surface to direct rendered visual content towards an eye of a user, and one or more elastically deformable position adjustment members operable to flexibly mount the optical member and adjust a spatial orientation of the optical member and thereby adjust a spatial orientation of the rendered visual content relative to the eye of the user, the one or more elastically deformable position adjustment members having one or more photochromatic regions that are moveable in response to exposure to ultraviolet (UV) light; and
one or more light sources operable to selectively emit illuminating UV light in a direction that contacts the one or more photochromatic regions to thereby adjust the spatial orientation of the optical member.

2. The head mounted display apparatus of claim 1, wherein the display unit further includes a projector member operable to project the rendered visual content.

3. The head mounted display apparatus of claim 1, wherein:
the one or more elastically deformable position adjustment members comprises a polymer substrate, and
the one or more photochromatic regions are composed of a photochromatic material that is embedded into the polymer substrate.

4. The head mounted display apparatus of claim 3, wherein the photochromatic material comprises an organic photochromatic material.

5. The head mounted display apparatus of claim 4, wherein the organic photochromatic material comprises spiropyran.

6. The head mounted display apparatus of claim 1, wherein the one or more light sources comprise LED light sources.

7. The head mounted display apparatus of claim 1, wherein the one or more elastically deformable position adjustment members are interconnected to each other on a surface of the optical member.

8. A head mounted display system, comprising:
a head mounted display apparatus that includes a display unit having an optical member with a reflective surface to direct rendered visual content towards an eye of a user, one or more elastically deformable position adjustment members operable to flexibly mount the optical member and adjust a spatial orientation of the optical member, the one or more elastically deformable position adjustment members having one or more photochromatic regions that are moveable in response to exposure to ultraviolet (UV) light, and one or more light sources operable to selectively emit illuminating UV light in a direction that contacts the one or more photochromatic regions to thereby selectively adjust the spatial orientation of the optical member; and
a control module, operatively coupled to the one or more light sources, the control module including one or more processors and a non-transitory memory operatively coupled to the one or more processors comprising a set of instructions executable by the one or more processors to cause the one or more processors to:
dynamically adjust, in response to one or more of sensor data analysis and wireless communication network data, a spatial orientation of the rendered visual content relative to the eye of the user by causing movement of the optical member through a selective actuation of the one or more light sources.

9. The head mounted display system of claim 8, wherein the display unit further includes a projector member operable to project the rendered visual content.

10. The head mounted display system of claim 8, wherein:
the one or more elastically deformable position adjustment members comprises a polymer substrate, and
the one or more photochromatic regions are composed of a photochromatic material that is embedded into the polymer substrate.

11. The head mounted display system of claim 10, wherein the photochromatic material comprises an organic photochromatic material.

12. The head mounted display system of claim 11, wherein the organic photochromatic material comprises spiropyran.

13. The head mounted display system of claim 8, wherein the one or more light sources comprise LED light sources.

14. The head mounted display system of claim 8, wherein the set of instructions cause the one or more processors to dynamically change the direction of light reflected by the optical member by selectively adjusting an intensity of the UV light emitted by the one or more light sources.

15. A computer-implemented method of operating a head mounted display (HMD) apparatus, the computer-implemented method comprising:
dynamically adjusting, in response to one or more of sensor data analysis and wireless communication network data, a spatial orientation of rendered visual content relative to an eye of a user of the head mounted display system by causing movement of an optical member of the HMD apparatus through a selective actuation of one or more light sources to selectively emit illuminating UV light in a direction that contacts one or more photochromatic regions of one or more elastically deformable position adjustment members that are moveable in response to exposure to the illuminating UV light,
wherein the one or more elastically deformable position adjustment members are operable to flexibly mount the optical member.

16. The computer-implemented method of claim 15, wherein the sensor data relates to one or more of a 3D virtual reality environment and a 3D augmented reality environment of the user.

17. The computer-implemented method of claim 15, wherein dynamically adjusting the spatial orientation of the rendered visual content comprises selectively adjusting an intensity of the UV light emitted by the one or more light sources.

18. The computer-implemented method of claim 15, wherein dynamically adjusting the spatial orientation of the rendered visual content comprises selectively adjusting a spatial orientation of the one or more light sources relative to the one or more elastically deformable position adjustment members.

19. The computer-implemented method of claim 15, wherein dynamically adjusting the spatial orientation of the rendered visual content comprises dynamically adjusting a direction of UV light emitted by the one or more light sources.

20. The computer-implemented method of claim 15, wherein dynamically adjusting the spatial orientation of the rendered visual content comprises dynamically adjusting a spatial orientation of the optical member.

* * * * *